June 14, 1927.

F. W. MERRILL

ELECTRIC MOTOR

Original Filed April 11, 1921

1,631,977

Inventor:
Frank W. Merrill
by E.W. Adams, Atty.

Patented June 14, 1927.

1,631,977

UNITED STATES PATENT OFFICE.

FRANK W. MERRILL, OF FORT WAYNE, INDIANA, ASSIGNOR TO WESTERN ELECTRIC COMPANY, INCORPORATED, OF NEW YORK, N. Y., A CORPORATION OF NEW YORK.

ELECTRIC MOTOR.

Original application filed April 11, 1921, Serial No. 460,597. Divided and this application filed April 1, 1924. Serial No. 703,348.

This invention relates to electric motors and is a division of my copending application, Serial No. 460,597, filed April 11, 1921. It has particular reference to electric motors which are designed to drive loads continuously and without interruption.

In its broadest aspect the invention has for its object the operation of a driven member by means of alternative driving members which may be automatically substituted one for the other.

One object of the invention is to so design an electric motor that it may be shifted during full operation from one source of current to another without decreasing its speed or mechanical output.

Another object of the invention is to so connect such a specially designed motor in circuits supplied with currents of different characteristics that the motor may be switched from one source of current to the other without decreasing its speed or mechanical output.

More specifically, the invention comprises a motor device having a single field winding and a single armature provided with two commutators or two sets of slip rings, or a commutator and one set of slip rings, in combination with different sources of current connected to each pair of these devices, and means whereby the circuits of said sources of current may be alternately closed through said devices.

Still another physical embodiment of the invention comprises a single field winding and two electrically independent armature windings, each provided with a commutator or a set of slip rings, a different source of current being connected to these devices, and means whereby the circuits of said sources of currents may be alternately closed through said devices.

Figure 1:
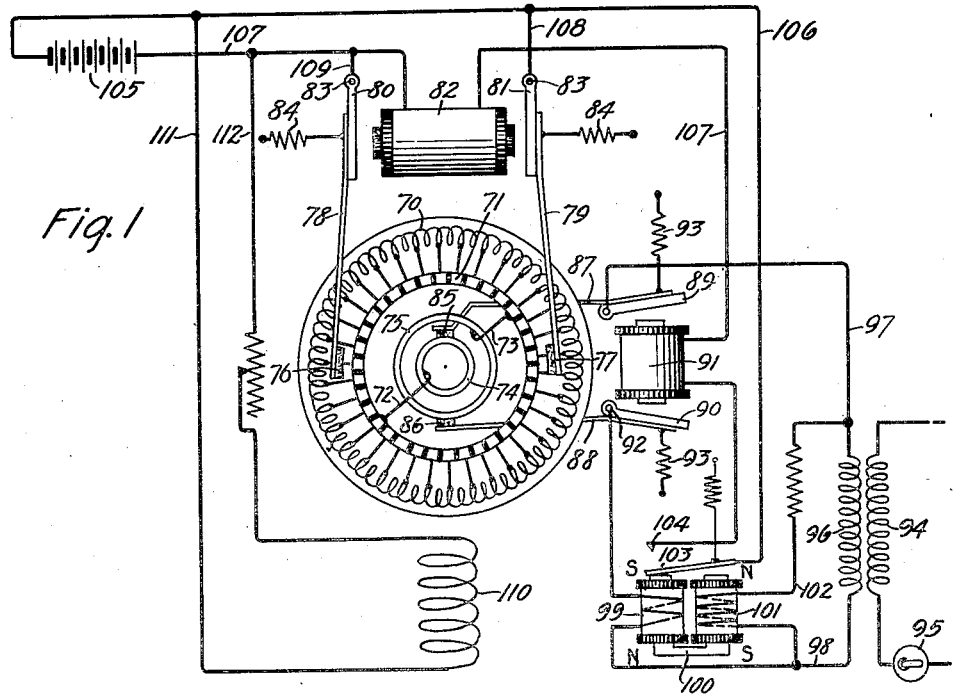

Other features of the invention not specifically mentioned above will more clearly appear from the following specification and accompanying drawings in which Fig. 1 is a schematic illustration of a motor of the synchronous type constructed in accordance with this invention. There is shown in this figure, circuit connections for the motor whereby it may be shifted from one source of current supply to the other.

Figure 2:
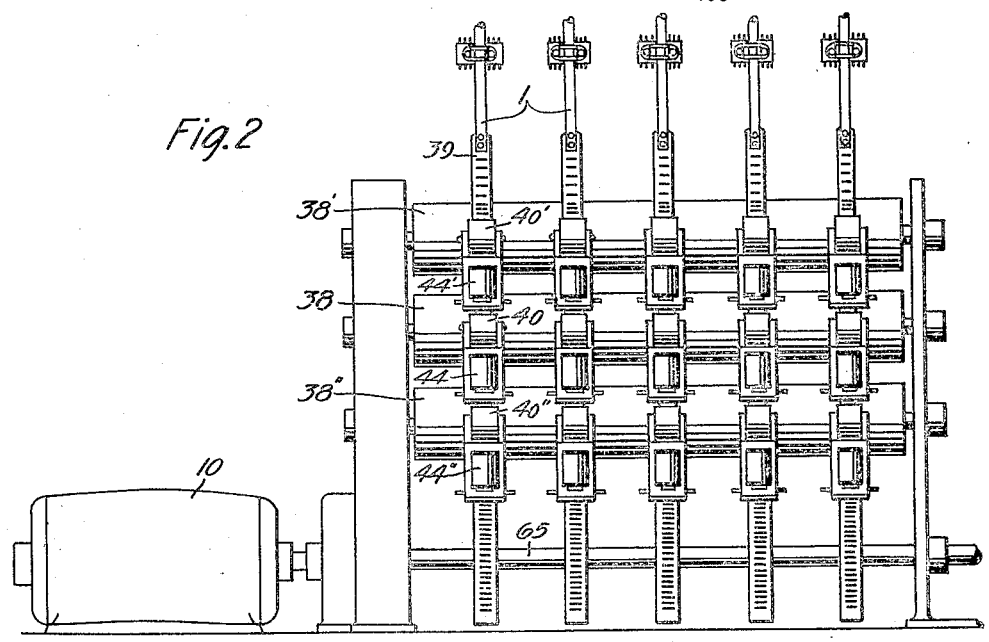

Fig. 2 is a fragmentary front elevation of a frame of automatic switches of a telephone exchange showing a motor embodying the invention, mechanically connected thereto, for actuating the continuous moving mechanism thereof.

Since synchronous motors are electric machines of well known design, a detailed description or illustration thereof is not thought necessary, and in Fig. 1 a synchronous motor is only diagrammatically illustrated. In this figure, reference numeral 70 indicates the armature winding of the motor, the coils of which are connected to a commutator 71. Diametrically opposite points of the commutator are connected by leads 72 and 73 with slip rings 74 and 75, respectively. Cooperating with the commutator 71 are brushes 76 and 77 carried by arms 78 and 79 which are secured to armatures 80 and 81 respectively. These armatures are adapted to be attracted by the opposite poles of an electromagnet 82. The armatures 80 and 81 are pivoted at points 83 and, when the magnet 82 is deenergized, are swung under the influence of springs 84 so that the brushes 76 and 77 are held in a position in which they are out of contact with the commutator 71. Cooperating with the slip rings 74 and 75 are brushes 85 and 86, respectively, carried by arms 87 and 88 attached to armatures 89 and 90, respectively, of magnet 91. The armatures 89 and 90 are pivoted at points 92 and when the magnet 91 is deenergized the brushes 85 and 86 are held in contact with their respective slip rings by means of springs 93.

The control circuit hereafter to be described is so arranged that while alternating current is being supplied to the brushes 85 and 86 to drive the armature, magnets 91 and 82 are deenergized so that these brushes and brushes 76 and 77 occupy the positions shown in Fig. 1. However, when the source of alternating current fails, the magnets 91 and 82 are energized, the energization of the former withdrawing the brushes 85 and 86 out of contact with their associated slip rings, and the energization of the latter causing the brushes 76 and 77 to be brought into contact with the commutator 71 closing the direct current supply circuit for driving the armature. The operation of magnets 91 and 82 is simultaneous so that the the transition of current supply to the armature is instantaneous, causing it to be constantly driven from one source or the other without diminishing its speed or mechanical output.

The control circuit for the relays 82 and 91 together with the arrangements of the two sources of current supply for the armature will now be described. Alternating current is fed into the primary winding 94 of a transformer through a suitable type of switch 95. The secondary winding 96 of the transformer has one end connected to the armature 89 by conductor 97, and its other end connected to the armature 90 by a conductor 98. In series with conductor 98 is a winding 99 of a relay 100. This relay is provided also with a second winding 101 connected in shunt of the secondary winding 96 by a conductor 102. The relay 100 is provided with an armature 103 cooperating with a contact 104, the armature being connected to one side of a source of direct current such as a battery 105 by conductor 106, the contact 104 being connected in series with the windings of magnets 91 and 82 and to the opposite side of the battery 105 by means of conductor 107. The brushes 76 and 77 are connected to the conductors 106 and 107, respectively, by conductors 108 and 109. Flux is supplied the armature winding 70 by means of a field winding 110 which is constantly excited by current from the battery 105 through conductors 111 and 112 which are connected to conductors 106 and 107.

With the switch 95 closed, the armatures of the magnets 82, 91 and relay 100 will occupy the positions shown in Fig. 1. Alternating current is then supplied the rotor over the following circuit: from one side of the secondary winding 96 of the transformer, conductor 97, armature 89, brush 85, slip ring 74, conductor 72, armature winding 70, conductor 73, slip ring 75, brush 86, armature 90, series winding 99 of relay 100, conductor 98, back to the other side of the transformer 96. Flux is supplied the armature 70 by the field winding 110 which is energized from battery 105, through conductors 111 and 112. The energization of the series winding 99 of relay 100 causes it to hold its armature in an attracted position in which it is out of engagement with its associated contact 104. The armature 103 is also attracted by the energization of the shunt coil 101 of the relay 100 through conductor 102. While the armature 103 is in its attracted position, the circuit of the magnets 91 and 82 hereafter to be described is broken so that the brushes 76, 77 and 85, 86 are under control of their associated springs and held in positions shown.

Should the switch 95 be opened or the source of alternating current supplying the primary winding 94 of the transformer fail, the rotor 70 will operate as a generator, causing the current flowing in the circuit connecting the slip rings 74 and 75 with the secondary winding 96 of the transformer to flow in series through both coils of relay 100, whereupon the coils 99 and 101 operate differentially, permitting the armature 103 to release and move into engagement with its associated contact 104, closing a circuit for the energization of magnets 91 and 82. This circuit may be traced from one side of the battery 105, conductor 106, armature 103, contact 104, winding of magnet 91, winding of magnet 82, conductor 107, back to the other side of battery 105. Relay 91 upon energizing attracts its armatures 89 and 90, lifting the brushes 85 and 86 out of contact with their associated slip rings, thereby breaking the generating circuit connecting these slip rings with the secondary winding 96 of the transformer. Magnet 82 upon energizing attracts its armatures 80 and 81 causing brushes 76 and 77 to be brought into contact with the commutator 71 closing an armature circuit which may be traced from one side of battery 105, conductor 106, conductor 108, brush 77, commutator 71, brush 76, conductor 109, conductor 107, back to the other side of battery. With the brushes 76 and 77 in contact with commutator 71, the armature will be driven by direct current supplied from battery 105. Upon the closure of switch 95 or the resumption of the alternating current supply, the relay winding 99 is energized, causing it to attract its armature 103, breaking the energizing circuits of the magnets 82 and 91, and restoring the circuit conditions shown in Fig. 1.

Since magnets 82 and 91 are energized substantially simultaneously with the deenergization of relay 100 and are deenergized substantially simultaneously with the energization of the said relay 100, the transition from one source of current supply fed to the armature to the other source of current supply fed thereto, is substantially instantaneous, permitting no loss in speed of the mechanical output of the rotor.

Due to the fact that motors made in accordance with this invention may be instantaneously shifted from one source of current supply to the other without decrease in speed of mechanical output, they have a wide application in power work where a constant drive is required. Such a motor, for instance, is particularly adapted to actuate switching apparatus of the panel type used in automatic and semi-automatic telephone systems. In such systems, machine switching apparatus has three rolls which must be continuously driven in order to give uninterrupted telephone service. A fragmentary part of such a machine switching apparatus is illustrated in Fig. 2 and for an explanation of the functions of the continuously driven rolls, reference is made to Patent No. 1,103,623, issued July 14, 1914 to J. N. Reynolds which discloses and describes a switching apparatus of this general type. In order to simplify the understanding of the mechanism shown in Fig. 2, the elements thereof have been given the same reference numerals by which these same parts are designated in the patent above mentioned. The three rolls 38, 38' and 38" (shown in Fig. 2) are driven through a suitable gear train (not shown) by a shaft 65 to which is mechanically connected a motor constructed in accordance with the present invention. The use of such a motor insures a constant actuation of the driving shaft 65 and the rolls driven thereby resulting in a continuous power for operating the switching elements, whereby uninterrupted telephone service is realized.

What is claimed is:

1. In a motor control system, a synchronous motor having a single field winding and a single armature winding, slip rings and a commutator connected to said armature winding, one set of brushes cooperating with said slip rings and normally in engagement therewith, a second set of brushes cooperating with said commutator and normally out of engagement therewith, separate sources of current connected to the brushes cooperating with the commutator and slip rings, means for moving said second set of brushes into engagement with said commutator to close one current source therethrough upon failure of the current source connected with the brushes cooperating with said slip rings, and means for moving the first set of brushes out of engagement with said slip rings upon failure of the current source connected thereto.

2. In a motor control system, a synchronous motor having a single field winding and a single armature winding, slip rings and a commutator connected to said armature winding, one set of brushes cooperating with said slip rings and normally in engagement therewith, a second set of brushes cooperating with said commutator and normally out of engagement therewith, separate sources of current connected to the brushes cooperating with the commutator and slip rings, means for moving said second set of brushes into engagement with said commutator to close one current source therethrough upon failure of the current source connected with the brushes cooperating with said slip ring, and means for moving the first set of brushes out of engagement with said slip rings upon the failure of the current source connected thereto, said last-mentioned means comprising a relay having two windings, one in shunt of one current source and the other in series with the brushes cooperating with said slip rings.

3. In a motor control system, a motor having a commutator and slip rings, brushes cooperating therewith, separate sources of current connected respectively to said commutator and to said slip rings, means for automatically moving the brushes cooperating with said commutator into engagement therewith to close the current source with said commutator upon failure of the current source connected to said slip rings, and means for moving the brushes out of engagement with said slip rings upon failure of the current source connected thereto.

4. In a motor control system, a synchronous motor having a single field winding and a single armature winding, slip rings and a commutator connected to said armature winding, one set of brushes cooperating with said slip rings and normally in engagement therewith, a second set of brushes cooperating with said commutator and normally out of engagement therewith, separate sources of current connected respectively to said set of brushes, a magnet associated with each set of brushes, a circuit extending to said magnets, and means for closing said circuit to move the first set of brushes cooperating with said slip rings out of engagement therewith and to move the second set of brushes cooperating with said commutator into engagement therewith.

5. In a motor control system, a synchronous motor having a single field winding and a single armature winding, slip rings and a commutator connected to said armature winding, one set of brushes cooperating with said slip rings and normally in engagement therewith, a second set of brushes cooperating with said commutator and normally out of engagement therewith, separate sources of current connected respectively to said sets of brushes, a magnet associated with each set of brushes, a circuit extending to said magnets, and a relay controlled by one of said sources of current for closing said circuit to move the first set of brushes cooperating with said slip rings out of engagement therewith and to move the second set of brushes cooperating with said commutator into engagement therewith.

6. In a motor control system, a synchronous motor having a single field winding and a single armature winding, a plurality of sets of current supply devices connected to said armature winding, one set of brushes cooperating with one set of said supply devices and normally in engagement therewith, a second set of brushes cooperating with a second set of said supply devices and normally out of engagement therewith, separate sources of current connected respectively to said sets of brushes, means for automatically moving the second set of brushes into engagement with the set of supply devices with which it cooperates upon failure of the current source connected to the other set of brushes, and means for moving the first set of brushes out of engagement with the set of supply devices with which it cooperates upon failure of the current source connected thereto.

In witness whereof, I hereunto subscribe my name this 28th day of March A. D., 1924.

FRANK W. MERRILL.